US012514768B2

(12) United States Patent
Wagner et al.

(10) Patent No.: US 12,514,768 B2
(45) Date of Patent: Jan. 6, 2026

(54) MATTRESS BLADDER FORMING A PLANAR SUPPORT SURFACE

(71) Applicant: Hill-Rom Services, Inc., Batesville, IN (US)

(72) Inventors: Catherine M. Wagner, Osgood, IN (US); Taylor Franklin, Batesville, IN (US); Timothy M. Volk, Cleves, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 17/702,250

(22) Filed: Mar. 23, 2022

(65) Prior Publication Data

US 2022/0313518 A1 Oct. 6, 2022

Related U.S. Application Data

(60) Provisional application No. 63/169,148, filed on Mar. 31, 2021.

(51) Int. Cl.
*A61G 7/057* (2006.01)
*A47C 27/10* (2006.01)

(52) U.S. Cl.
CPC .......... *A61G 7/05776* (2013.01); *A47C 27/10* (2013.01); *A61G 7/05769* (2013.01)

(58) Field of Classification Search
CPC ............ A61G 7/05776; A61G 7/05769; A61G 7/05746; A61G 7/05753; A61G 7/05761; A61G 7/05784; A61G 7/05792; A47C 27/10; A47C 27/087; A47C 27/08; A47C 27/081; A47C 27/082; A47C 27/083; A47C 27/084; Y10T 428/24744
See application file for complete search history.

(56) References Cited

U.S. PATENT DOCUMENTS 2,604,641 A 7/1952 Reed
5,044,030 A 9/1991 Balaton
6,163,909 A * 12/2000 Lin ........................ A47C 27/10 5/713

(Continued)

FOREIGN PATENT DOCUMENTS

CN 2381305 Y 6/2000
CN 201888900 U 7/2011

(Continued)

OTHER PUBLICATIONS

Extended European Search Report in related EP Application No. EP22165173.0A, Aug. 5, 2022, 6 pages.

(Continued)

*Primary Examiner* — David R Hare
*Assistant Examiner* — Deborah Talitha Gedeon
(74) *Attorney, Agent, or Firm* — Barnes & Thornburg LLP

(57) ABSTRACT

An apparatus, method for the apparatus, and system for using the apparatus that comprises an air bladder formed of a baffle assembly with a plurality of equal-length flaps secured to the inside of an impermeable flexible outer layer and having a port secured to the outer layer to allow air to flow into and out of the air bladder, such that when the air bladder is inflated, the baffle assembly supports the shape of the air bladder.

20 Claims, 7 Drawing Sheets

(56) References Cited

U.S. PATENT DOCUMENTS

| | | | | |
|---|---|---|---|---|
| 6,701,559 | B2 * | 3/2004 | Boso | A47C 27/087 5/713 |
| 8,719,984 | B2 * | 5/2014 | Miller, Jr. | A47C 27/10 5/713 |
| 8,756,732 | B2 | 6/2014 | Lachenbruch | |
| 9,021,638 | B2 | 5/2015 | Misaki | |
| 10,631,659 | B2 | 4/2020 | Xia et al. | |
| D900,266 | S | 10/2020 | Stoter | |
| 2004/0128772 | A1 * | 7/2004 | Branson | A61G 7/05776 5/713 |
| 2007/0044240 | A1 * | 3/2007 | Chen Han | A61G 7/05776 5/655.3 |
| 2010/0281618 | A1 * | 11/2010 | O'Reagan | A61G 7/05769 5/709 |

FOREIGN PATENT DOCUMENTS

| | | | | | |
|---|---|---|---|---|---|
| CN | 201894412 | U | | 7/2011 | |
| JP | 6674779 | B2 | | 4/2020 | |
| WO | WO-2015023932 | A1 | * | 2/2015 | A47C 27/087 |
| WO | WO-2015030419 | A1 | * | 3/2015 | B29C 66/73921 |
| WO | WO-2019231987 | A1 | * | 12/2019 | A47C 27/081 |
| WO | 2020071525 | A1 | | 4/2020 | |

OTHER PUBLICATIONS

Office Action under Art. 94(4) EPC in related EP application EP22165173.0-1113, Nov. 4, 2024.

* cited by examiner

MATTRESS BLADDER FORMING A PLANAR SUPPORT SURFACE

PRIORITY CLAIM

This application claims priority under 35 U.S.C. § 119 (e) to U.S. Provisional Application No. 63/169,148, filed Mar. 31, 2021, which is expressly incorporated by reference herein.

BACKGROUND

The present disclosure is related to an air bladder for an inflatable patient support surface and a method for making the air bladder. More specifically, the present disclosure is related to forming a bladder structure such that the bladder forms a planar surface and, when multiple ones of the bladders are placed adjacent one another, forming a generally planar surface in a section of an inflatable patient support surface.

The use of inflatable bladders in patient support surfaces or mattresses is well known. Round bladders, or bladders with curved bodies have generally been used as the bladder structure is flexible and inflation results in bulging or curving of the external surfaces of the bladder. Importantly, the purpose of an air bladder in an air mattress is normally to control the interface pressure exerted on a person's skin when they are supported on the patient support surface. It is known that lying on a surface over extended periods results in injury to a person's skin. When a person is in a hospital bed, such as in a critical care hospital bed, the patient is often immobile due sedation or serious injury.

While air bladders provide an ability to control the pressure that supports the patient and allows for inflating and deflating of the bladder to vary the pressure placed on the patient, the curved nature of air bladders can still concentrate pressure at the positions on the patient that engage the apex of the curved surface. The challenges of resolving the curved surfaces of the bladder structure is controlling the billowing that occurs over the span of a surface area, while still allowing the surface to flex and provide a controlled cushioning of the patient.

SUMMARY

The present disclosure includes one or more of the features recited in the appended claims and/or the following features which, alone or in any combination, may comprise patentable subject matter.

According to a first aspect of the present disclosure, a method of forming an air bladder having a planar surface comprises forming a first blank assembly, forming a second blank assembly, securing the first blank assembly and second blank assembly to form a baffle assembly, securing the baffle assembly to a blank forming an outer surface of the bladder, and sealing the bladder. Forming the first blank assembly includes forming a flexible planar first fabric blank having a width and a length defining two lateral edges and two longitudinal edges, the first fabric blank having a first fabric blank axis that extends along the length of the first fabric blank, forming a flexible planar second fabric blank having a width and a length defining two lateral edges and two longitudinal edges, the second fabric blank having a second fabric blank axis that extends along the length of the second fabric blank, positioning a portion of the first fabric blank in an overlapping confronting juxtaposition with a portion the second fabric blank, securing the first fabric blank to the second fabric blank along a first linear seam parallel to the first fabric blank axis and the second fabric blank axis to form a first blank assembly.

Forming the second blank assembly includes forming a flexible planar third fabric blank having a width and a length defining two lateral edges and two longitudinal edges, the third fabric blank having a first fabric blank axis that extends along the length of the third fabric blank, forming a flexible planar fourth fabric blank having a width and a length defining two lateral edges and two longitudinal edges, the fourth fabric blank having a fourth fabric blank axis that extends along the length of the fourth fabric blank, positioning a portion of the third fabric blank in an overlapping confronting juxtaposition with a portion the fourth fabric blank, and securing the third fabric blank to the fourth fabric blank along a first linear seam parallel to the third fabric blank axis and the fourth fabric blank axis to form a second blank assembly. Forming the baffle assembly includes placing the first blank assembly on the second blank assembly with the first linear seam of the first blank assembly overlying the first linear seam of the second blank assembly and securing the first blank assembly to the second blank assembly along a second linear seam parallel to the first linear seams of the first and second blank assemblies to form a baffle assembly with four flaps that extend from the linear seam, with the linear seam being a root for each flap and each flap having a distal edge spaced apart from the root.

The method further includes forming a flexible planar fifth fabric blank having a width and a length defining two lateral edges and two longitudinal edges. Securing the baffle assembly includes securing each flap to the fifth fabric blank along a respective linear seam that is parallel to the linear seam at the root of the bladder assembly, the distance between the respective linear seams securing each of the flaps to the fifth fabric blank being equally spaced, folding the fifth fabric blank across the width of the fifth fabric blank to position the baffle assembly between the halves of the folded fifth fabric blank with a first portion of the fifth fabric blank positioned in a confronting juxtaposition with a second portion of the fifth fabric blank to form two layers, and securing the two layers of the fifth fabric blank along a linear seam that is parallel to the root of baffle assembly to form a bladder shell. The bladder is completed by sealing the ends of the bladder shell to form the air bladder.

In some embodiments, sealing the ends further includes the step of forming end flaps at the opposite longitudinal ends of the fifth fabric blank and securing the flaps to other portions of the fifth fabric blank to seal the ends of the bladder body to form the air bladder.

In some embodiments, the flaps cooperate with the flaps of the baffle assembly to control the outer shape of the air bladder.

In some embodiments, the fabric blanks comprise a nylon weaved fabric coated with urethane.

In some embodiments, the step of securing of the first fabric blank to the second fabric blank at the first linear seam comprises radio frequency welding the first fabric blank to the second fabric blank.

In some embodiments, the baffle assembly has a respective longitudinal length that is less than a longitudinal length of the fifth fabric blank such that when the bladder is formed, a gap is formed between the flaps and the respective ends of the air bladder to allow air to flow freely around the flaps and throughout the interior of the air bladder.

In some embodiments, the method may further comprise the step of securing at least one port to the fifth blank such that the port provides a path for fluid to flow into and out of the air bladder.

According to a second aspect of the present disclosure, a bladder for an air mattress comprises an air impermeable flexible outer layer forming a bladder shell having a length, the bladder shell defining an inner space, at least one port positioned in the outer layer, the port providing a flow path to communicate air into and out of the inner space of the bladder, and a baffle assembly. The baffle assembly is positioned in the inner space and includes a plurality of flaps, each flap having a first end and a second end, the first end of each flap secured together at a common root with the respective flap extending from the root to a second end, the second end of each flap being secured to the flexible outer layer, such that the flaps of the baffle assembly cooperate to control the shape of the outer layer when the inner space is filled with pressurized air.

In some embodiments, the baffle assembly comprises at least four flaps that, when the bladder is inflated, extend from a common root and control the shape of the outer surface of the bladder.

In some embodiments, the flexible outer layer includes two ends, the two ends cooperating with the flaps to control the shape of the bladder to define a planar outer surface.

In some embodiments, the outer layer and the flaps comprise a nylon weave.

In some embodiments, the flaps are radio frequency welded to seal the bladder.

In some embodiments, the length of the baffle assembly is shorter than the length of the outer layer such that air is free to pass through baffle assembly throughout the inner space.

According to a third aspect of the present disclosure, a patient support surface comprises a cover and a bladder assembly positioned within the cover, the bladder assembly including a plurality of bladders arranged together to cooperate to form a generally planar support surface. Each bladder of the bladder assembly includes an air impermeable flexible outer layer forming a bladder shell having a length defining a longitudinal axis, the bladder shell defining an inner space, at least one port positioned in the outer layer, the port providing a flow path to communicate air into and out of the inner space of the bladder, and a baffle assembly. The baffle assembly is positioned in the inner space and includes a plurality of flaps, each flap having a first end and a second end, the first end of each flap secured together at a common root with the respective flap extending from the root to a second end. The second end of each flap is secured to the flexible outer layer, such that the flaps of the baffle assembly cooperate to control the shape of the outer layer when the inners space is filled with pressurized air. The flaps of the baffle assembly are sized to cause the outer layer to form a plurality of planar surfaces parallel to the longitudinal axis of the respective bladder shell. The plurality of bladders are positioned with each bladder having a first planar surface confronting a first planar surface of an adjacent bladder, the adjacent bladders each having a second planar surface perpendicular to the first planar surface, the second planar surfaces of the bladders cooperating to define a planar support surface.

In some embodiments, the ports of the bladders of the bladder assembly are interconnected such that the inner space of each of the bladders is in fluid communication with the inner space of an adjacent bladder.

In some embodiments, the bladder assembly includes at least three bladders with two outer bladders and inner bladder positioned between the outer bladders, the outer bladders fluidly interconnected such that the inner space of each of the outer bladders is in fluid communication with the inner space of the other outer bladder, the inner bladder not in fluid communication with the outer bladders.

In some embodiments, the bladder assembly includes at least four bladders with arranged in a side-by-side configuration, wherein the four bladders are arranged such that two of the bladders that are not adjacent to each other are fluidly interconnected such that the inner space of each of the non-adjacent bladders is in fluid communication with the inner space of the other of the non-adjacent bladder and the other of the two bladders are fluidly interconnected, independently of each other.

In some embodiments, the length of the baffle assembly of each bladder is shorter than the length of the respective outer layer such that air is free to pass through baffle assembly throughout the inner space.

In some embodiments, each baffle assembly comprises at least four flaps that, when the respective bladder is inflated, extend from a common root, each flap positioned at a ninety degree angle relative to adjacent flaps.

In some embodiments, the flexible outer layer of each respective bladder includes two ends, the two ends having a square shape and cooperating with the flaps of the respective baffle assembly to control the shape of the bladder to define a plurality of planar outer surfaces.

In some embodiments, the outer layer and the flaps of the baffle assembly of each respective bladder comprise a nylon weave.

In some embodiments, the flaps of the baffle assembly of each respective bladder are radio frequency welded to the outer layer of the bladder.

In some embodiments, at least a first portion of the ends of the outer layer are radio frequency welded to a at least a second portion of the outer layer to define the shape of the respective bladder when the bladder is inflated with pressurized air to expand the bladder to a fully inflated state.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
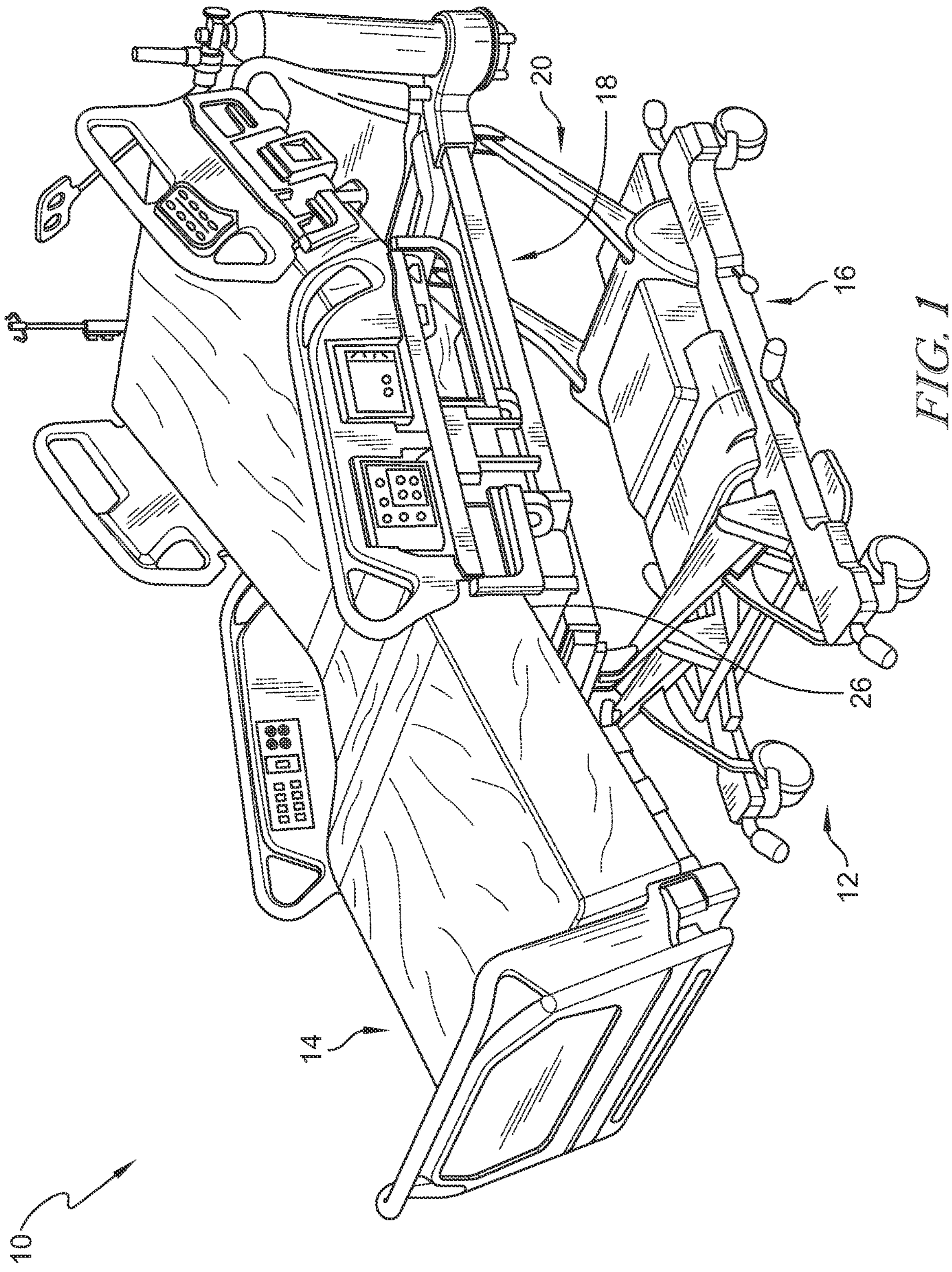
FIG. 1 is a perspective view of a patient support apparatus including a patient support surface employing air bladders forming a planar surface.

Referring to FIG. 1, a patient support apparatus 10 is embodied as a hospital bed frame 12 and a patient support surface 14 mounted on the hospital bed frame 12. In other embodiments, the hospital bed frame 12 may be replaced with a stretcher, a surgical table, an examination table, or any other structure suitable for supporting a patient support surface 14. In the present disclosure, the patient support surface 14 is embodied as a mattress with inflatable portions as will be described in further detail below. In the present disclosure, the reference to the patient support apparatus 10 may include reference to either the hospital bed frame 12 or the patient support surface 14 each separately, or the hospital bed frame 12 or the patient support surface 14 together as a combined unit.

The hospital bed frame 12 illustratively includes a lower frame 16, an upper frame 18, and a lift system 20 coupled to the lower frame 16 and the upper frame 18, as shown in FIG. 1. The lift system 20 is configured to raise and lower the upper frame 18 relative to the lower frame 16. The patient support apparatus 12 also includes a deck 26 coupled to the upper frame 18 that supports the patient support surface 14.

Figure 2:
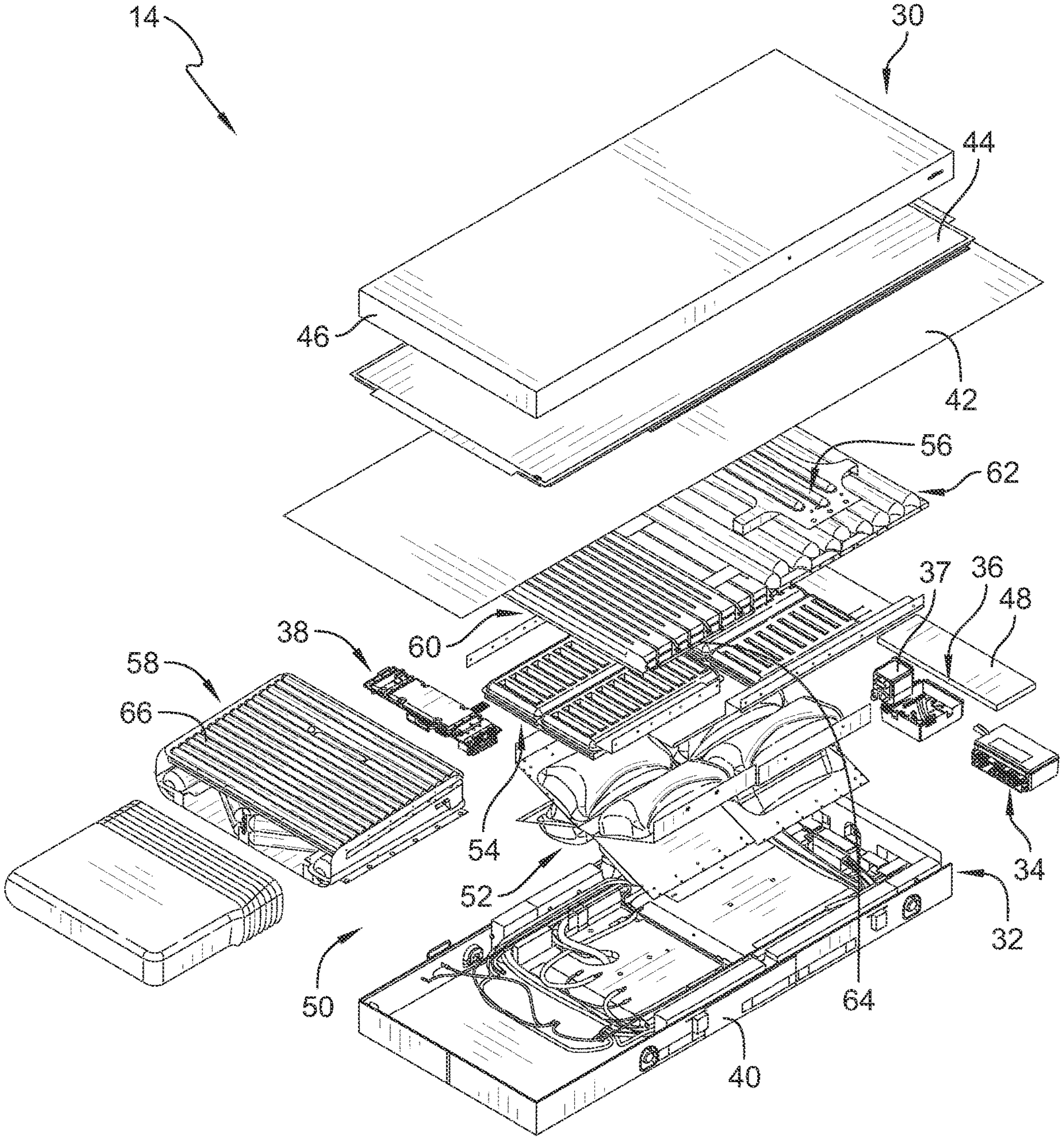
FIG. 2 is an exploded view of the patient support surface of FIG. 1, the patient support surface including a section of bladders cooperating to form a planar surface.

Referring to FIG. 2, the patient support surface 14 illustratively includes a cover 30, a foam support structure 32, a control box 34, an enclosure 36, a blower 37, a secondary manifold 38, and a plurality of inflatable bladders 50, as shown in FIG. 2. A foam shelf 48 covers the control box 34 and the electrical enclosure 36, as shown in FIG. 2.

The cover 30 illustratively includes a lower ticking 40 and an upper ticking 46. The patient support surface 14 also includes a fire barrier 42 and a microclimate management system (also called a MCM) 44, as shown in FIG. 2. The fire barrier 42 is coupled to the lower ticking 40 and extends over the inflatable bladders 50 to encase the inflatable bladders 50, the control box 34, the electrical enclosure 36, the foam shelf 48, the secondary manifold 38, and the foam support structure 32, as is shown in FIG. 2. The upper ticking 46 is coupled to the lower ticking 40 by a zipper and overlies the fire barrier 42 and the MCM 44.

The shelf 48 underlies and supports a portion of the upper body section 62 and overlies the control box 34, the electrical enclosure 36, and the blower 37. The control box 34, enclosure 36, blower 37, and secondary manifold 38 cooperate to control the flow of air into and out of the various inflatable portions of the patient support surface 14 as is known in the art.

Figure 3:
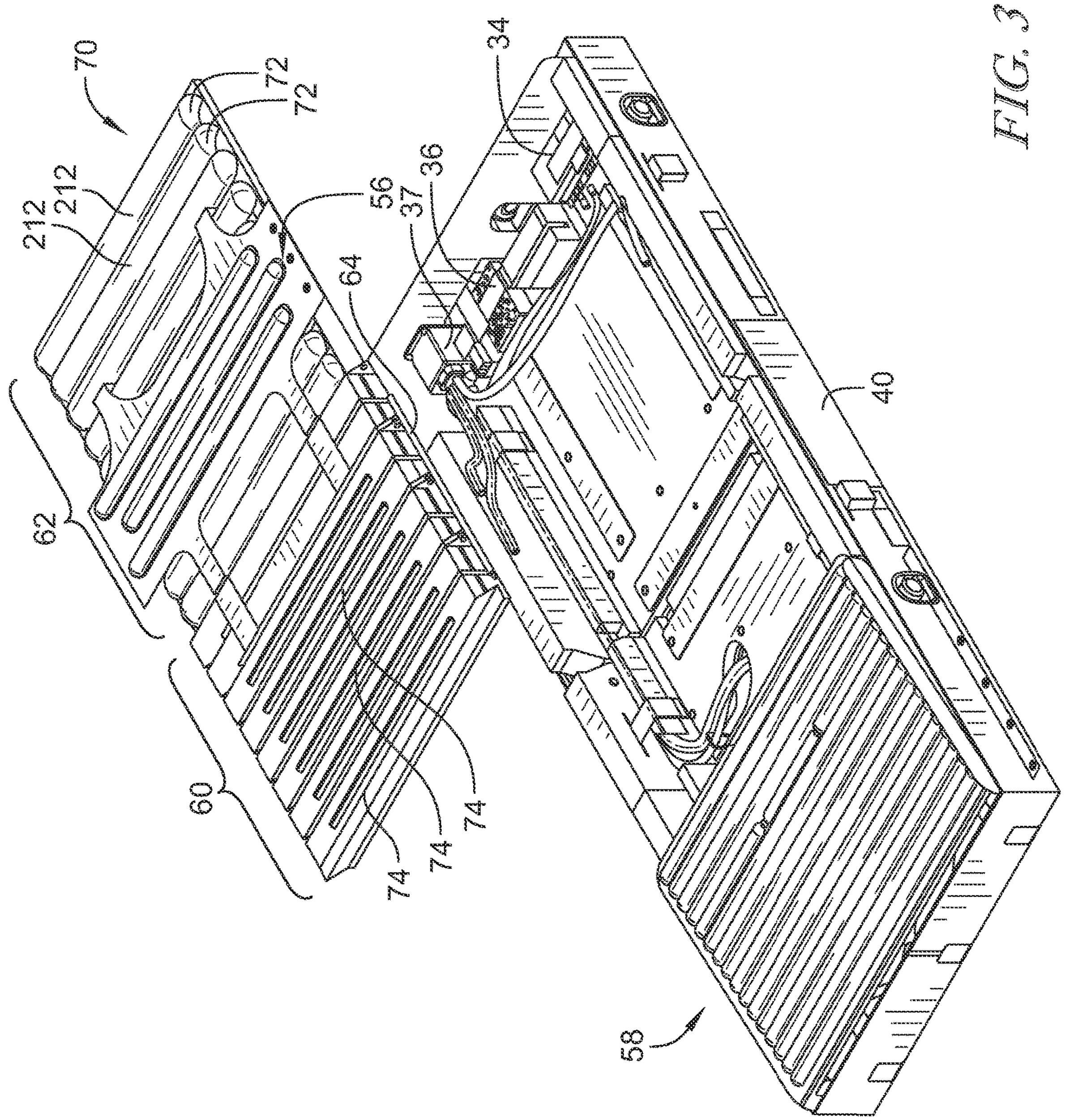
FIG. 3 is an exploded perspective view of a portion of the patient support surface.

The inflatable bladders 50 included in the patient support surface 14 illustratively include turn bladders 52 (sometimes called rotation bladders), working cushions 54, support cushions 70, and percussion and vibration bladders 56, as shown in FIG. 2-3. Then normally deflated turn bladders 52 are inside the foam support structure 32 and are configured to be inflated to rotate a patient on the patient support surface 14. The normally inflated working cushions 54 are located just above the turn cushions 52 and underlie a seat section 60 and an upper body section 62 of the support cushions 70, as shown in FIG. 2. The working cushions 54 provide continuous support to the patient on the patient support surface 14 and cooperate with the turn cushions 52 during rotation of a patient on the patient support surface 14 as is known in the art. The percussion and vibration bladders 56 are positioned above the upper body section 62 of the support cushions 70 and are configured to apply percussive and/or vibratory therapies to a patient lying on the patient support surface 14. Support cushions 70 are configured to be inflated to support a patient lying on the patient support surface 14 and act to limit the shear force on a patient's body.

Referring to FIGS. 2-5, the upper body support section 62 of the support cushions 70 comprise round support bladders 72. The support section 60 of the support cushions 70 includes support bladders 74 which are the subject of the present disclosure. The upper body support section 62 is located at a head end of the patient support surface 14. The lower body support section 60 is configured to support the torso and upper legs of a patient positioned on the patient support surface 14. A leg support section 58 includes an undulating surface 66.

Figure 4:
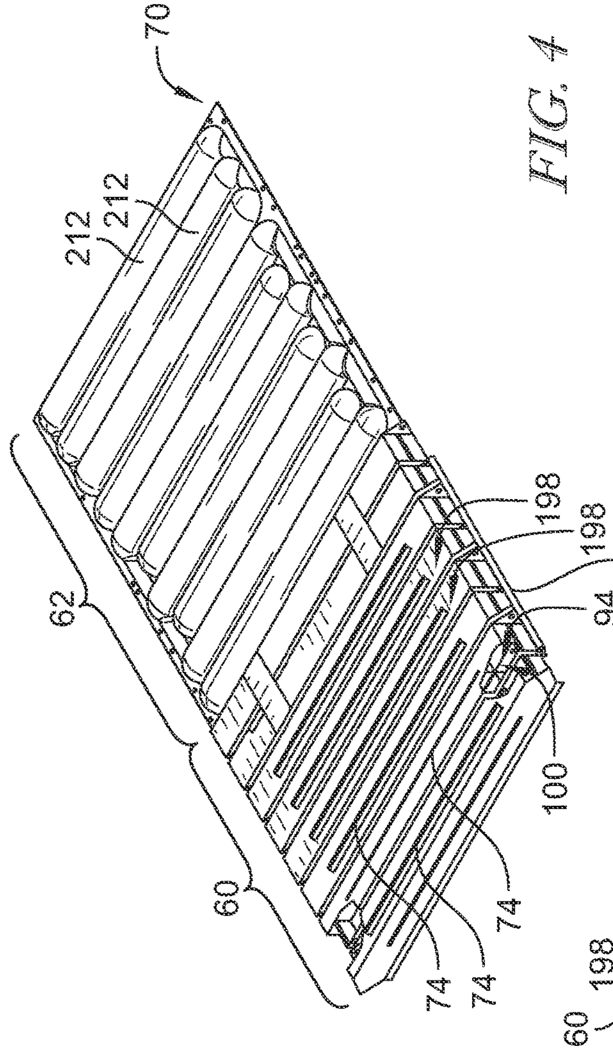
FIG. 4 is a perspective view of the support bladders of the patient support surface.
Figure 9:
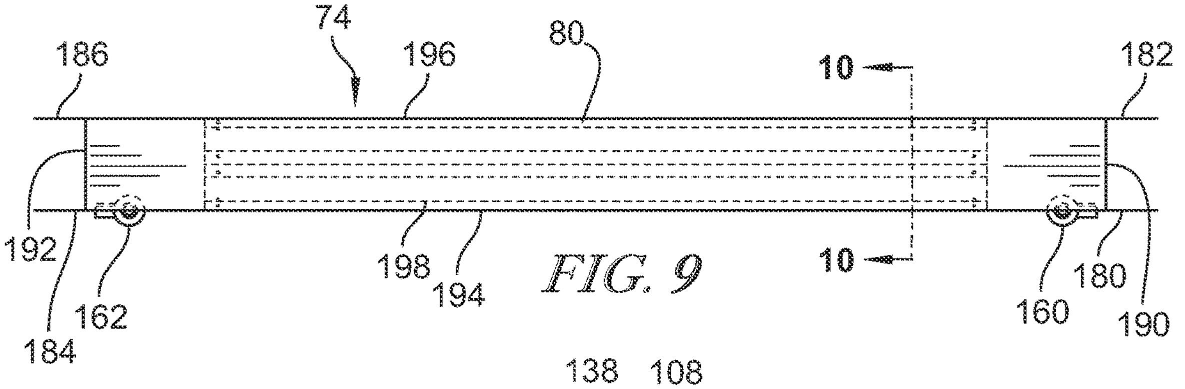
FIG. 9 is a plan view of the bladder of FIG. 7.
Figure 10:
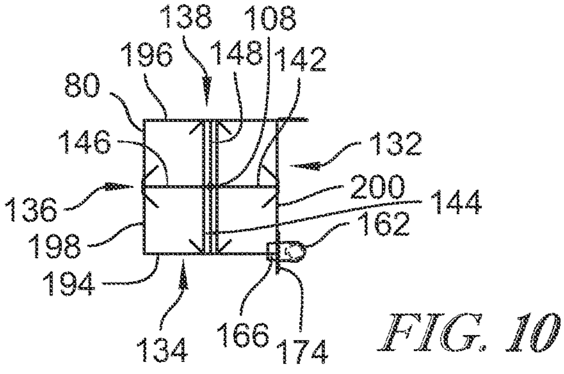
FIG. 10 is a traverse section view taken along lines 10-10 in FIG. 9.
Figure 11:
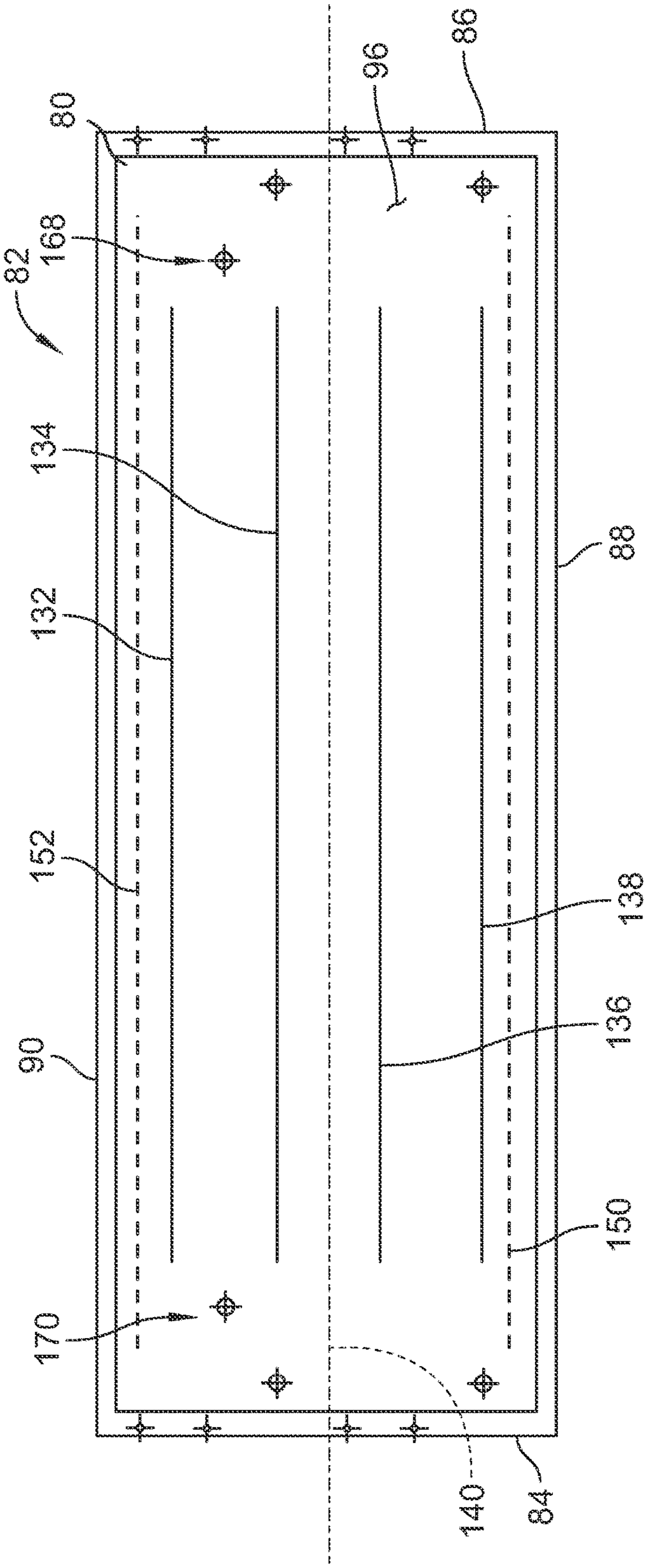
FIG. 11 is a plan view of a fabric blank used to form an outer shell of a bladder according to the present embodiment.
Figure 12:
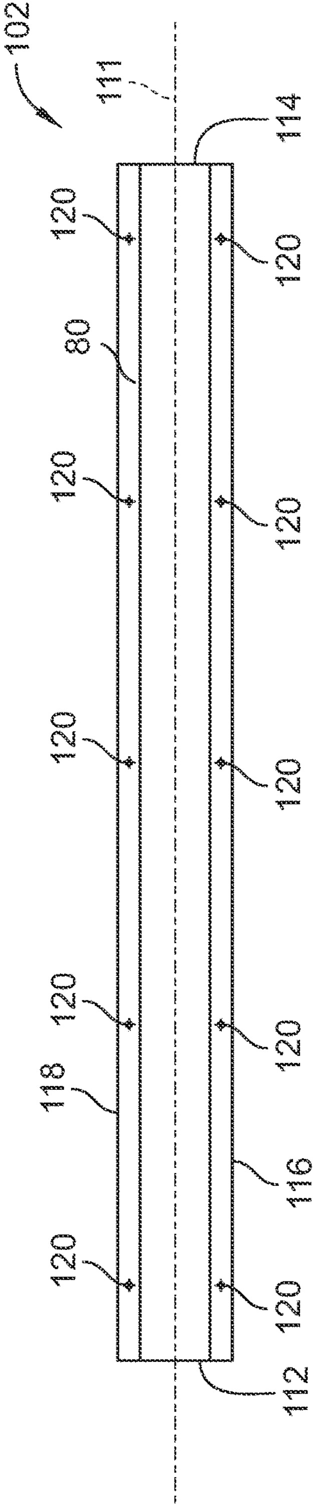
FIG. 12 is a plan view of a fabric blank used to form a portion of the baffle structure used to form a support bladder having a planar support surface.

The support bladders 74 have an air impermeable flexible outer layer forming a bladder shell 80, as shown in FIGS. 7-12. The bladder shell 80 is formed from a rectangular fabric blank 82 as shown in FIG. 11. The inner area 94 of the support bladder 74 contains a baffle assembly 100 as shown in FIG. 4. The baffle assembly 100 is formed from four identical fabric blanks 102 shown in FIG. 12. Each of the blanks 102 are formed to have a first end edge 112 and a second end edge 114. The blanks 102 also are formed to have a first side edge 116 and a second side edge 118.

Figure 13:
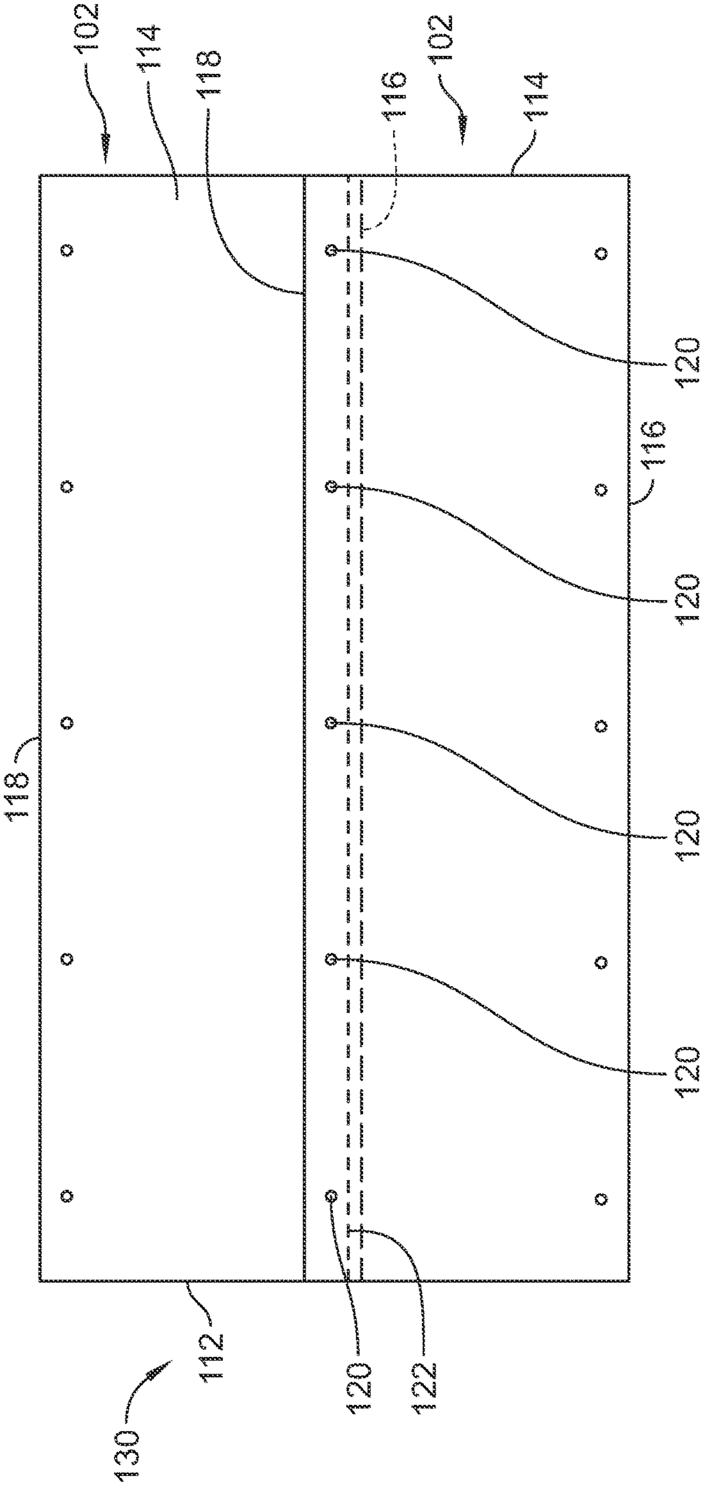
FIG. 13 is a plan view of the blanks of FIGS. 11 and 12 positioned in preparation for welding together.

The method of forming the baffle assembly 100 includes three steps. First, a pair of blanks 102 are arranged as suggested in FIG. 13 with the end edges 112 and 114 aligned on both blanks 102. A portion of a first blank 102 is positioned to overlie a portion of a second blank 102 so that the side edge 118 of the top blank 102 positioned inboard of the side edge 116 of the lower blank 102. To facilitate the positioning, tooling holes 120 formed in each of the blanks 102 are aligned. Once the blanks 102, 102 are aligned as shown in FIG. 13, the blanks 102, 102 are welded together at 122 to form a blank assembly 130. In the next step, this process is repeated with a second set of blanks 102, 102 to form a second blank assembly 130. Where fabric blanks are indicated as secured or welded, they may be electively radio frequency (RF) welded. Alternatively, they may be glued or otherwise fastened in an airtight manner as is known in the art.

Figure 14:
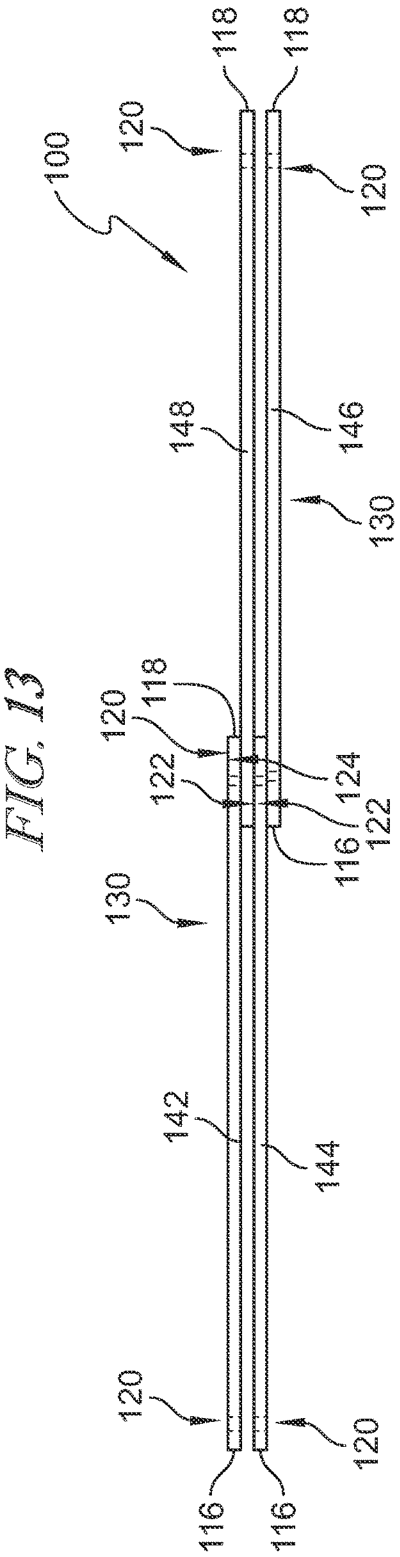
FIG. 14 is an end view of the baffle assembly prior to being secured in the support bladder.

In the final step, the blank assemblies 130 are arranged as shown in FIG. 14 with a first blank assembly 130 positioned on top of a second blank assembly 130 and with their welds 122 aligned. Aligning the two blank assemblies 130, 130, with their tool holes 120, all four blanks 102 are welded together at a weld 124 to form a root 108 of the baffle assembly 100.

Referring again to FIG. 11, the fabric blank 82 has a top surface 96. For illustration purposes, four weld locations 132, 134, 136, and 138 are shown. The baffle assembly 100, when formed, creates four flaps 142, 144, 146, and 148 as shown in FIG. 14. To assemble the baffle assembly 100 to the blank 82, the edge of each of the flaps 142, 144, 146, and 148 are joined to the blank 82 and the respective weld locations 132, 134, 136, and 138. The baffle assembly 100 is positioned on the surface 96 of the blank 82 with the flaps 144 and 146 positioned against the surface 96. The flaps 142 and 148 are folded out of the way and the flap 144 is moved be positioned with the side edge 116 positioned near the weld location 134 and the flap 144 is welded all along the length as indicated by the weld location 134. Flap 142 is then moved to allow the side edge 116 to be positioned at weld location 132 and welded in a similar manner. This process is repeated with the side edges 118 of flaps 146 and 148 being welded at weld location 136 and 138 respectively. Because the blanks 102 are flexible, the flaps 142, 144, 146, and 148 are manipulated into position to allow for the welding at the locations 132, 134, 136, and 138.

Figure 7:
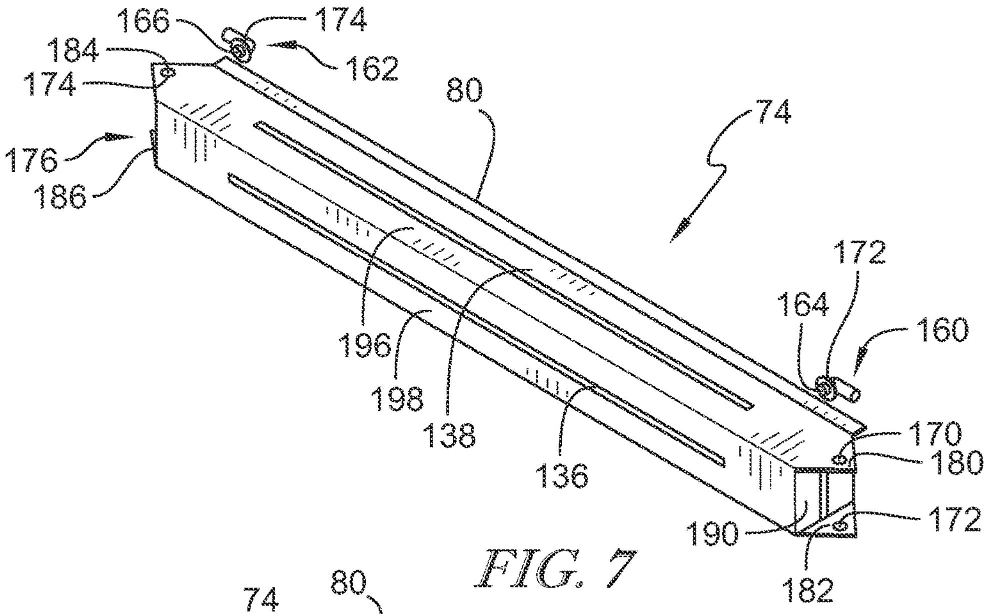
FIG. 7 is a perspective view of a support bladders having a planar support surface.
Figure 8:
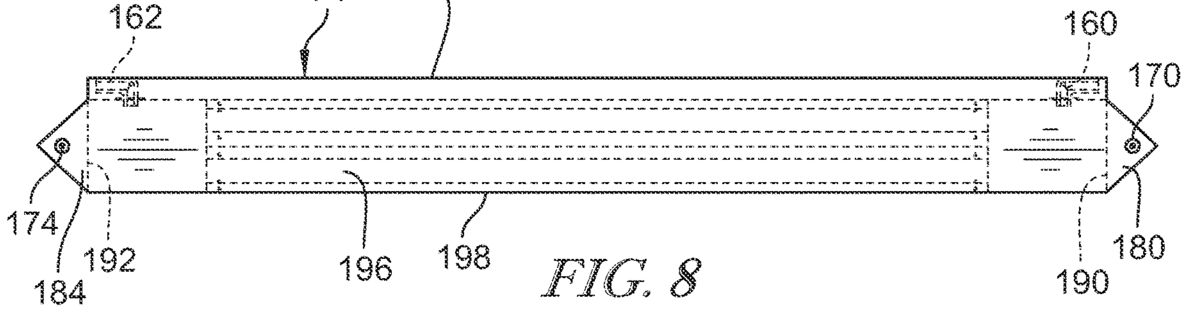
FIG. 8 is a longitudinal elevation of the bladder of FIG. 7.

The blank 82 is formed to include two end edges 84, 86 and two side edges 88, 90. Once the baffle assembly 100 is secured to the blank 82, the bladder 74 is formed by folding the welded structure about an axis 140 shown in dotted line in FIG. 11 so that the edges 88 and 90 are aligned and then a welded together as indicated at the weld locations 152, 154 shown on the blank 82. This results in excess material forming a flap 156 on the bladder 74 as shown in FIGS. 7-9. In addition, there is excess material that is folded and welded to seal the ends as shown in FIGS. 7-9. The resulting structure is sealed at both ends.

Referring to FIG. 7, two ports 160, 162 include inlets 164, 166 that are inserted into two holes 168, 170 formed in the blank 82 as shown in FIG. 11. Flanges 172, 174 of the respective ports are then welded to the bladder shell 80. The ports 160 is used to allow air to flow into and out of the bladder 74. The port 162 allows the pressure in the bladder 74 to be sensed by a pressure sensor associated with the control box 34 to allow the control box 34 to determine the pressure in the bladder 74 and any other bladders 74 connected to the bladder 74 through the port 160. In some of the bladders 74 the hole and port 162 may be omitted as unnecessary.

Figure 5:
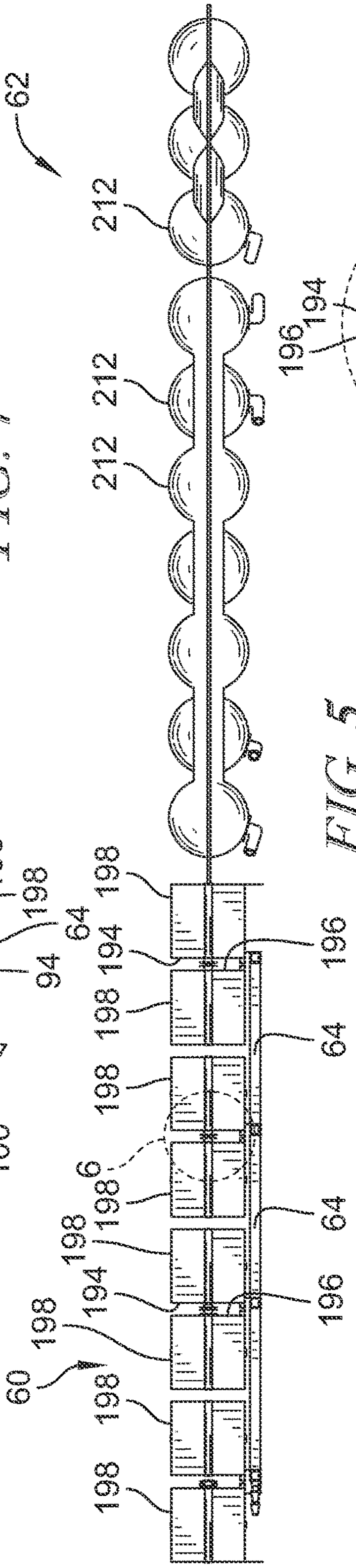
FIG. 5 is an elevation view of the support bladders of the patient support surface with pairs of the support bladders having planar support surfaces attached to each other.
Figure 6:
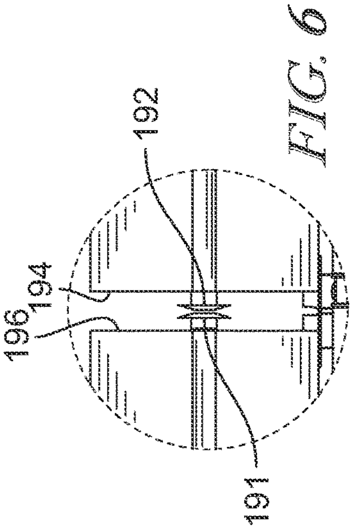
FIG. 6 is an enlarged view of a portion of FIG. 5 shown in the circle of FIG. 5.

The completed bladder 74 includes locations 170, 172, 174, and 176 on triangular flaps 180, 182, 184, 186 formed from the blank 82 and extending from the ends of the bladder 74. As shown in FIGS. 5 and 6, these locations are used to attach mating snap members 191, 192 to allow adjacent bladders 74 to be joined together in pairs. The locations that are not shown may be folded out of the way when the section 60 is assembled or may be used to secure the bladder 74 to another portion of the patient support surface 14 to secure the section 60 for movement relative to the remainder of the patient support surface 14.

When the bladder 74 is inflated, the baffle assembly 100 controls the shape of the bladder to a generally square cross-section as shown in FIG. 10. As shown in the cut-away view of FIG. 4, the baffle assembly 100 does not extend to the entire length of the bladder 74, but a gap extends between the edges 112 or 114 of the blanks of the bladder assembly and an end wall 190 or 192 of the bladder 74. As shown in FIG. 10, the flaps 142, 144, 146, and 148 are all placed in tension and pull away from the root 108 of the baffle assembly 100 when the bladder 74 is inflated. This causes the flaps 142, 144, 146, and 148 to constrain expansion of the side walls 194, 196, top wall 198, and bottom wall 200 and thereby form planar surface on the outer surfaces of each of the walls 194, 196, 198, and 200 respectively. Referring now to FIG. 5, the adjacent side walls 194 and 196 then maintain a close proximity in a confronting juxtaposition which helps reduce the potential for the bladders 74 to rotate about their longitudinal axis. Additionally, the top surfaces 208 of each of the top walls 198 of the bladders 74 in the section 60 cooperate to form a planar surface over the entire section 60 when all the bladders 74 are inflated. This helps reduce areas of localized high pressure on a patient's skin as would occur with the apexes 212 of the round bladders 72 of the section 62 as seen in FIG. 5. In this way, during a continuous low pressure inflation cycle, the patient's weight will be evenly distributed over the surfaces 208 and not experience localized areas of higher pressure, thereby reducing the risk of the development of bed sores.

As shown in FIG. 3-5, the bladders 74 of section 60 are connected such that every other bladder 74 is connected to an air hose 64. The bladders 74 that are not connected to the air hose 64 are connected to a second air hose on the opposite side of the section, but not visible in the views shown. The use of separate air hoses allows the bladders 74 to be operated to provide alternating low pressure therapy as is known in the art. Thus the section 60 may be operated in a continuous low pressure mode as discussed above and where each of the bladders 74 are inflated to the same pressure, or the alternating low pressure mode known in the art.

Although certain illustrative embodiments have been described in detail above, variations and modifications exist within the scope and spirit of this disclosure as described and as defined in the following claims.

The invention claimed is:

1. A bladder for an air mattress comprising an air impermeable flexible outer layer forming a bladder shell having a longitudinal length with a top wall for supporting a patient, a bottom wall parallel to the top wall, two side walls formed perpendicular to and extending between the top wall and the bottom wall, and a pair of end walls positioned at each longitudinal end of the bladder shell, the bladder shell defining an inner space, the flexible outer layer formed to include a pair of flaps extending longitudinally away from each end wall of the bladder shell, each flap being parallel to the side walls, the flaps each including a fastener configured to couple to a mating fastener on a flap of an adjacent bladder, at least one port positioned in the outer layer, the port providing a flow path to communicate air into and out of the inner space of the bladder, and a baffle assembly positioned in the inner space and including a plurality of flaps, each flap having a first end and a second end, each flap including a plurality of through holes formed adjacent the first end, the through holes of each of the flaps being aligned when the first end of each flap is secured together at a common root with the respective flap extending from the root to a second end, the second end of each flap being secured to the flexible outer layer, such that the flaps of the baffle assembly cooperate to control the shape of the outer layer when the inner space is filled with pressurized air, wherein the length of the baffle assembly is shorter than the length of the outer layer such that air is free to pass through baffle assembly throughout the inner space.

2. The bladder of claim 1, wherein the baffle assembly comprises at least four flaps that, when the bladder is inflated, extend from a common root and control the shape of the outer surface of the bladder.

3. The bladder of claim 1, wherein the two ends of the bladder shell cooperate with the flaps of the baffle assembly to control the shape of the bladder to define a planar outer surface.

4. The bladder of claim 1, wherein the outer layer and the flaps of the baffle assembly comprise a nylon weave.

5. The bladder of claim 4, wherein the end of the bladder shell are radio frequency welded to seal the bladder.

6. The bladder of claim 1, wherein the flaps of the baffle assembly comprise a nylon weave.

7. The bladder of claim 6, wherein the flaps of the baffle assembly are radio frequency welded to one another.

8. A patient support surface comprising a cover, and a bladder assembly positioned within the cover, the bladder assembly including a plurality of bladders arranged together to cooperate to form a generally planar support surface, wherein each bladder of the bladder assembly includes an air impermeable flexible outer layer forming a bladder shell having a longitudinal length defining a longitudinal axis and having a top wall for supporting a patient, a bottom wall parallel to the top wall, two side walls formed perpendicular to and extending between the top wall and the bottom wall, a pair of end walls positioned at each longitudinal end of the bladder shell, the bladder shell defining an inner space, the flexible outer layer formed to include a pair of flaps extending longitudinally away from each end wall of the bladder shell, each flap being parallel to the side walls, the flaps of each bladder shell including a fastener secured to a fastener on a flap of an adjacent one of the plurality of bladders, at least one port positioned in the outer layer, the port providing a flow path to communicate air into and out of the inner space of the bladder, and a baffle assembly positioned in the inner space and including a plurality of flaps, each flap having a first end and a second end, each flap including a plurality of through holes formed adjacent the first end, the through holes of each of the flaps being aligned when the first end of each flap is secured together at a common root with the respective flap extending from the root to a second end, the second end of each flap being secured to the flexible outer layer, such that the flaps of the baffle assembly cooperate to control the shape of the outer layer when the inner space is filled with pressurized air, the flaps of the baffle assembly being sized to cause the outer layer to form a plurality of planar surfaces parallel to the longitudinal axis of the respective bladder shell, the plurality of bladders being positioned with each bladder having a first planar surface confronting a first planar surface of an adjacent bladder, the adjacent bladders each having a second planar surface perpendicular to the first planar surface, the second planar surfaces of the bladders cooperating to define a planar support surface, wherein the length of the baffle assembly of each bladder is shorter than the length of the respective outer layer such that air is free to pass through baffle assembly throughout the inner space.

9. The patient support surface of claim 8, wherein the ports of the bladders of the bladder assembly are interconnected such that the inner space of each of the bladders is in fluid communication with the inner space of an adjacent bladder.

10. The patient support surface of claim 8, wherein the bladder assembly includes at least three bladders with two outer bladders and inner bladder positioned between the outer bladders, the outer bladders fluidly interconnected such that the inner space of each of the outer bladders is in fluid communication with the inner space of the other outer bladder, the inner bladder not in fluid communication with the outer bladders.

11. The patient support surface of claim 8, wherein the bladder assembly includes at least four bladders with arranged in a side-by-side configuration, wherein the four bladders are arranged such that two of the bladders that are not adjacent to each other are fluidly interconnected such that the inner space of each of the non-adjacent bladders is in fluid communication with the inner space of the other of the non-adjacent bladder and the other of the two bladders are fluidly interconnected, independently of each other.

12. The patient support surface of claim 8, wherein each baffle assembly comprises at least four flaps that, when the respective bladder is inflated, extend from a common root, each flap positioned at a ninety degree angle relative to adjacent flaps.

13. The patient support surface of claim 12, wherein the two ends of each respective bladder having a square shape and cooperating with the flaps of the respective baffle assembly to control the shape of the bladder to define a plurality of planar outer surfaces.

14. The patient support surface of claim 13, wherein the outer layer and the flaps of the baffle assembly of each respective bladder comprise a nylon weave.

15. The patient support surface of claim 14, wherein the flaps of the baffle assembly of each respective bladder are radio frequency welded to the outer layer of the bladder.

16. The patient support surface of claim 14, wherein the flexible outer layer of each respective bladder includes two ends, the two ends having a square shape and cooperating with the flaps of the baffle assembly to control the shape of the bladder to define the plurality of planar outer surfaces.

17. The patient support surface of claim 16, wherein at least a first portion of the ends of the outer layer are radio frequency welded to an at least a second portion of the outer layer to define the shape of the respective bladder when the bladder is inflated with pressurized air to expand the bladder to a fully inflated state.

18. The patient support surface of claim 8, wherein the flexible outer layer of at least one of the plurality of bladders includes is formed to include a second at least one flap extending from the bladder shell, the second at least one flap including a fastener configured to be secured another portion of the patient support surface to secure the bladder assembly for movement relative to the remainder of the patient support surface.

19. A patient support surface comprising a cover, and a bladder assembly positioned within the cover, the bladder assembly including a plurality of bladders arranged together to cooperate to form a generally planar support surface, wherein each bladder of the bladder assembly includes an air impermeable flexible outer layer forming a bladder shell having a longitudinal length defining a longitudinal axis and having a top wall for supporting a patient, a bottom wall parallel to the top wall, two side walls formed perpendicular to and extending between the top wall and the bottom wall, a pair of end walls positioned at each longitudinal end of the bladder shell, the bladder shell defining an inner space, the flexible outer layer formed to include a pair of flaps extending longitudinally away from each end wall of the bladder shell, each flap being parallel to the side walls, the flaps of each bladder shell including a fastener secured to a fastener on a flap of an adjacent one of the plurality of bladders, at least one port positioned in the outer layer, the port providing a flow path to communicate air into and out of the inner space of the bladder, and a baffle assembly positioned in the inner space and including a plurality of flaps, each flap including a plurality of through holes formed adjacent a first end of each flap, the through holes of each of the flaps being aligned when the first end of each flap is secured together at a common root with the respective flap extending from the root to a second end of each flap; the plurality of flaps cooperate to control the shape of the outer layer when the inner space is filled with pressurized air, the flaps of the baffle assembly being sized to cause the outer layer to form a plurality of planar surfaces parallel to the longitudinal axis of the respective bladder shell, the plurality of bladders being positioned with each bladder having a first planar surface confronting a first planar surface of an adjacent bladder, the adjacent bladders each having a second planar surface perpendicular to the first planar surface, the second planar surfaces of the bladders cooperating to define a planar support surface, the flaps extending from the end walls of adjacent bladders being secured together with the fasteners to reduce rotation of the bladders about their rotational axis.

20. The patient support surface of claim 19, wherein the bladder assembly includes at least four bladders with arranged in a side-by-side configuration, wherein the four bladders are arranged such that two of the bladders that are not adjacent to each other are fluidly interconnected such that the inner space of each of the non-adjacent bladders is in fluid communication with the inner space of the other of the non-adjacent bladder and the other of the two bladders are fluidly interconnected, independently of each other.

* * * * *